United States Patent
Singh et al.

(10) Patent No.: US 9,688,036 B2
(45) Date of Patent: Jun. 27, 2017

(54) POST CURE INFLATOR

(71) Applicant: McNeil & NRM, Inc., Akron, OH (US)

(72) Inventors: Anand Pal Singh, Akron, OH (US); Daniel Zaklanovich, Tallmadge, OH (US); Jeffrey Bercsik, Uniontown, OH (US)

(73) Assignee: MCNEIL & NRM, INC., Akron, OH (US)

( * ) Notice: Subject to any disclaimer, the term of this patent is extended or adjusted under 35 U.S.C. 154(b) by 0 days.

(21) Appl. No.: 14/862,308

(22) Filed: Sep. 23, 2015

(65) Prior Publication Data

US 2016/0096336 A1    Apr. 7, 2016

Related U.S. Application Data

(60) Provisional application No. 62/058,289, filed on Oct. 1, 2014.

(51) Int. Cl.
*B29D 30/06* (2006.01)

(52) U.S. Cl.
CPC .................. *B29D 30/0643* (2013.01)

(58) Field of Classification Search
CPC .................................................. B29D 30/0643
See application file for complete search history.

(56) References Cited

U.S. PATENT DOCUMENTS

| 3,075,237 A | * | 1/1963 | Soderquist ......... B29D 30/0643 425/339 |
| 3,170,187 A | | 2/1965 | Brundage |
| 3,241,180 A | | 3/1966 | Brundage |
| 3,621,520 A | * | 11/1971 | Ulm ................... B29D 30/0643 425/34.1 |
| 3,792,145 A | | 2/1974 | Hugger et al. |
| 4,092,090 A | | 5/1978 | Yuhas et al. |
| 4,124,337 A | | 11/1978 | Martin |

(Continued)

FOREIGN PATENT DOCUMENTS

| DE | 1220118 B | 6/1966 |
| DE | 1729622 A1 | 6/1971 |

(Continued)

OTHER PUBLICATIONS

Extended European Search Report; Date of Report: Feb. 15, 2016; Applicant: McNeil & NRM, Inc.; Application No.: EP 15 18 7325; Place of Search: Munich; Date of Completion of Search: Feb. 2, 2016.

*Primary Examiner* — James Mackey
(74) *Attorney, Agent, or Firm* — Pearne & Gordon LLP

(57) ABSTRACT

A post cure tire inflator is provided for use with a tire press to inflate and cure vulcanized tires. The post cure inflator includes a frame fixed between a pair of outer support columns, a first movable beam that is linearly movable relative to the frame, and a second movable beam that is linearly movable relative to both of the frame and the first movable beam. A pair of inflator stations is arranged in a vertically separated formation with each inflator station including a pair of axially aligned, vertically separable tire inflating chuck rings. One of the tire inflating chuck rings from each pair of inflator stations is secured to the frame, and the other tire inflating chuck ring from each pair of inflator stations is secured to one of the first and second movable beams.

16 Claims, 10 Drawing Sheets

(56) References Cited

U.S. PATENT DOCUMENTS

| | | | |
|---|---|---|---|
| 4,169,698 A | | 10/1979 | Turk et al. |
| 4,944,951 A | * | 7/1990 | Katayama .......... B29D 30/0662 425/40 |
| 5,225,138 A | | 7/1993 | Irie |
| 7,311,872 B2 | | 12/2007 | Mitamura et al. |
| 7,740,464 B2 | * | 6/2010 | Militzer ............. B29D 30/0643 425/58.1 |
| 8,313,319 B2 | * | 11/2012 | Fujieda ............... B29C 35/0222 425/58.1 |
| 2006/0099285 A1 | | 5/2006 | Mitamura et al. |
| 2006/0169392 A1 | | 8/2006 | Akiyama et al. |
| 2009/0175975 A1 | | 7/2009 | Militzer et al. |
| 2011/0189324 A1 | | 8/2011 | Fujieda et al. |

FOREIGN PATENT DOCUMENTS

| | | |
|---|---|---|
| DE | 10 2007 001762 A1 | 7/2007 |
| EP | 0143538 A2 | 6/1985 |
| EP | 1568475 A1 | 8/2005 |
| EP | 1657049 A1 | 5/2006 |
| EP | 1971479 A | 7/2007 |
| WO | 2007079723 A1 | 7/2007 |

* cited by examiner

POST CURE INFLATOR

CROSS-REFERENCE TO RELATED APPLICATIONS

This application claims the benefit of U.S. Provisional Application No. 62/058,289, filed Oct. 1, 2014, the entire disclosure of which is hereby incorporated herein by reference.

FIELD OF THE INVENTION

The present invention relates generally to tire manufacturing, and more particularly, to a post cure inflator.

BACKGROUND OF THE INVENTION

Present day tire curing is accomplished by a tire curing press which shapes and cures the green or uncured tire carcass and then discharges the cured tire usually on an inclined conveyor at the rear of the press. If post cure inflation is employed, it is generally accomplished by a separate machine positioned at the rear of the press. For example, a post cure inflator (hereinafter "P.C.I.") can be used that allows the tire to cool in an inflated condition (e.g., 100 psi or other pressure), so as to prevent damage to the tire, such as flat spots or the like. In order to be positioned properly in the post cure inflator, the tire must be restrained or recaught after discharge from the press and properly centered for engagement with the bead engaging rims when the post cure inflator closes. Such restraint and centering devices which engage the outside or tread of the tire are complex and costly, requiring adjustment for different tire sizes. When tires are dropped onto a conveyor, particularly as the result of a stripping or ejecting mechanism imparting a force to the tire, the position the tire may obtain after striking the conveyor can vary widely due to the momentum achieved by the drop or by acceleration down an inclined conveyor, and the inherent resiliency or tendency to bounce in the tire itself. A common complaint about post cure inflators is that the tire restraint or centering devices fail to perform properly. Tires have been known to pass completely through a post cure inflator. Obviously, if the tire is not properly centered, a defective tire will result. Moreover, since the post cure inflator is usually interlocked with the tire curing press, a malfunction in the post curing operation may cause the press to stop. Various example post cure inflators can be seen in U.S. Pat. Nos. 4,169,698; 4,124,337; 4,092,090; and 3,075,237 which are incorporated herein by reference.

Current technology for post curing devices is generally in the form of 2-position, turnover and elevator type machines. Example disadvantages of these types of devices include, but are not limited to: Large space consuming frames; Costly motors and gear boxes requiring multiple service lines and connections, which cause high plant cost; Un-friendly to maintenance workers and operators, such as requiring access platforms, ladders and lifts required for operator ring change, restricted access to maintenance workers, and/or time consuming troubleshooting and maintenance schedules; Angle discharge of tires resulting in upended and misplaced tire positions; Multiple loading and unloading devices required for tire manipulation; Ring adjustment requires complex and costly machined parts; Accuracy of tire placement and loading of rings not consistent during post cure cycle; and Press to P.C.I. interface requires lengthy setup times with multiple device placement and high accuracy.

BRIEF SUMMARY OF THE INVENTION

The following presents a simplified summary of example embodiments of the invention. This summary is not intended to identify critical elements of the invention or to delineate the scope of the invention. The sole purpose of the summary is to present some example embodiments in simplified form as a prelude to the more detailed description that is presented later.

In accordance with one aspect, a post cure tire inflator is provided for use with a tire press to inflate and cure vulcanized tires. The post cure inflator comprises a frame fixed between a pair of outer support columns, a first movable beam that is linearly movable relative to the frame, and a second movable beam that is linearly movable relative to both of the frame and the first movable beam. A pair of inflator stations is arranged in a vertically separated formation with each inflator station comprising a pair of axially aligned, vertically separable tire inflating chuck rings. One of the tire inflating chuck rings from each pair of inflator stations is secured to the frame, and the other tire inflating chuck ring from each pair of inflator stations is secured to one of the first and second movable beams.

In accordance with another aspect, a post cure tire inflator is provided for use with a tire press to inflate and cure vulcanized tires. The post cure inflator comprises a pair of inflator stations arranged in a vertically separated formation with each inflator station comprising a pair of axially aligned, vertically separable tire inflating chuck rings, and a frame fixed between a pair of outer support columns. An adjustment mechanism is secured to the frame and is coupled to one of the tire inflating chuck rings from each pair of inflator stations to adjust a vertical position of said one of the tire inflating chuck rings from each pair of inflator stations relative to the frame.

In accordance with another aspect, a post cure tire inflator is provided for use with a tire press to inflate and cure vulcanized tires. The post cure inflator comprises a pair of inflator stations arranged in a vertically separated formation with each inflator station comprising a pair of axially aligned, vertically separable tire inflating chuck rings, and a frame fixed between a pair of outer support columns. A first movable beam is linearly movable relative to the frame, and a second movable beam is linearly movable relative to both of the frame and the first movable beam. An adjustment mechanism is secured to the frame and coupled to one of the tire inflating chuck rings from each pair of inflator stations. One tire inflating chuck ring from each pair of inflator stations is secured to and movable with one of the first and second movable beams. The other tire inflating chuck ring from each pair of inflator stations is secured to the adjustment mechanism to adjust a vertical position thereof. A locking system is coupled to at least one of the first and second movable beams and configured to selectively prevent movement of said movable beam relative to an adjacent outer support column.

It is to be understood that both the foregoing general description and the following detailed description present example and explanatory embodiments. The accompanying drawings are included to provide a further understanding of the described embodiments and are incorporated into and constitute a part of this specification. The drawings illustrate various example embodiments of the invention.

BRIEF DESCRIPTION OF THE DRAWINGS

The foregoing and other aspects of the present invention will become apparent to those skilled in the art to which the present invention relates upon reading the following description with reference to the accompanying drawings, in which.

DESCRIPTION OF EXAMPLE EMBODIMENTS

Figure 1:
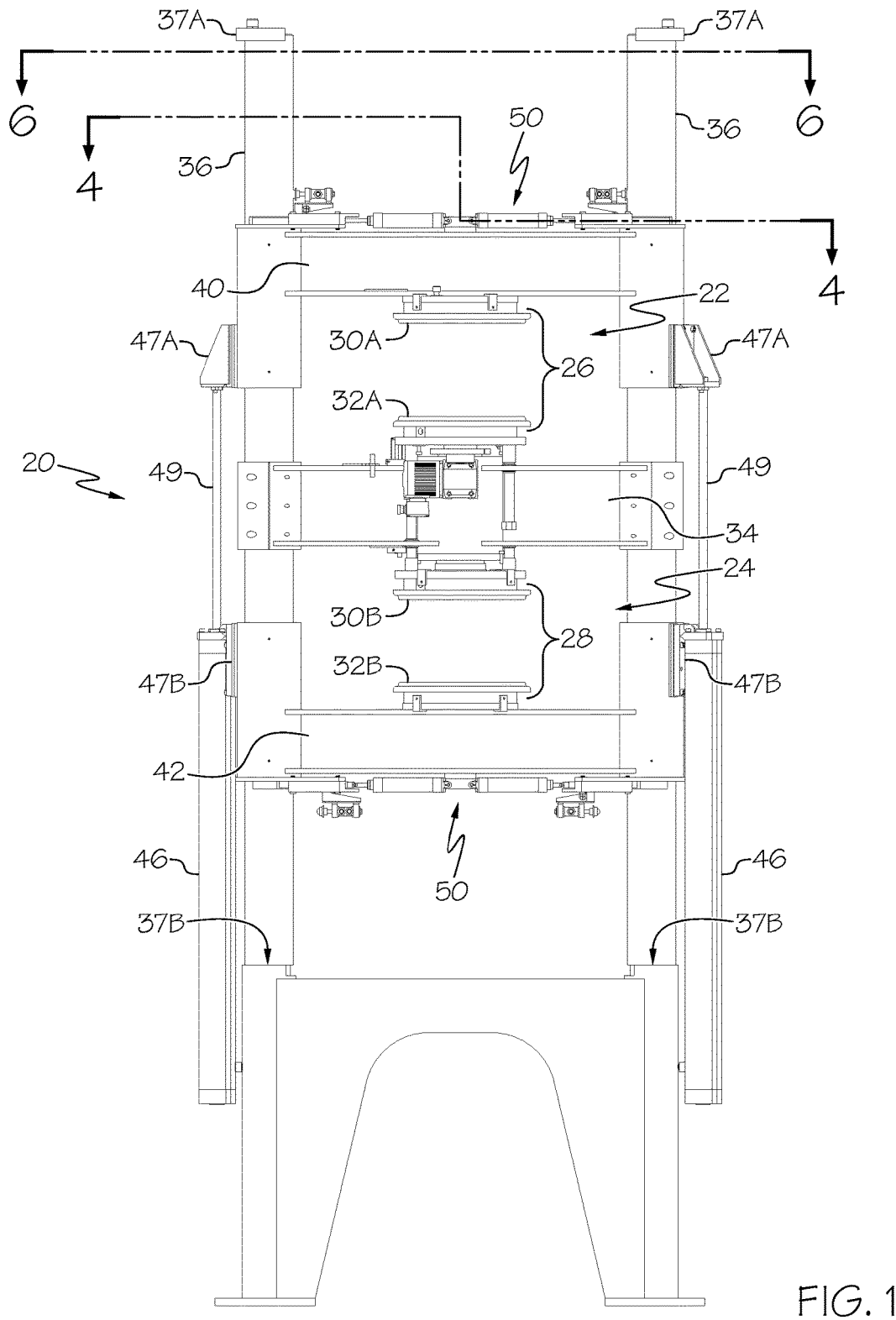
FIGS. 1-3 illustrate a front view of one example post cure inflator in different operative conditions.

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

Turning to the drawings, FIG. 1 illustrates a front view of one example post cure inflator 20. The post cure inflator 20 is located downstream from a tire curing press in a tire manufacturing process. Generally, post cure inflators are designed to be positioned at the rear of a single or dual cavity tire curing press (not shown) for inflating and curing vulcanized tires. In the shown example, the post cure inflator 20 is a two position P.C.I. assembly that has two tire post cure stations 22, 24. Typically, the post cure cycle time is about twice as long as a tire vulcanization press cycle. Thus, the two stations 22, 24 are arranged on a single post cure inflator in vertically separated formation such that two vulcanized tires can be post cured simultaneously (i.e., one tire each on station) while occupying relatively less lateral floor space. For example, one cured tire can be inflating in an already occupied station as another station is independently loaded or unloaded by a loading apparatus.

Each post cure station 22, 24 includes a pair 26, 28 of axially aligned, vertically separable tire inflating chuck rings receiving a tire from one cavity of the tire curing press to post cure the tire while inflated during substantially two cycles of the press. As shown, the first post cure station 22 includes the first pair 26 of inflating rims and is located vertically above the second post cure station 24 including the second pair 28 of inflating rims. It is also understood that other arrangements are contemplated, and that various numbers of tire curing press cavities, loaders and/or post cure inflators can be provided as desired. The tire inflating chuck rings can be generally conventional, including any or all of alignment structure, locking structure, inflating structure, etc. usable with a single size or multiple sizes of tires. For example, each pair 26, 28 includes an upper chuck ring 30A, 30B axially aligned with and vertically separable from a lower chuck ring 32A, 23B, respectively. Each pair of upper and lower chuck rings 30A/B, 32A/B is coupled to a fixed frame 34 with one of the upper and lower chuck rings being maintained at a fixed location on the fixed frame 34 while the other of the upper and lower chuck rings is vertically movable along the frame 34. Preferably, the pneumatic system used to inflate the tires during the post cure process is incorporated into the upper and lower chuck rings 32A, 30B that are secured to the fixed frame 34 to simply construction, service supply, and maintenance.

The frame 34 can be fixed between a pair of outer support columns 36, which are secured to a support surface, such as a supporting table or frame, a factory floor, etc. The outer support columns 36 may be connected directly to the support surface, or indirectly coupled to a main support frame of the post cure inflator 20. In one example, the frame 34 can be located generally between the upper and lower post cure stations 22, 24. In such an arrangement, the lower chuck ring 32A of the upper post cure station 22 is permanently fixed to the frame 34. The upper chuck ring 30A can be mounted to a movable beam 40 or the like supported by linear bearings or bushings 41 (see FIG. 6) upon the outer support columns 36 (or even an intermediate frame). The movable beam 40 is linearly movable relative to the fixed frame 34 with controlled vertical raise/lower by a powered mechanism, such as by an pneumatic cylinder, electric motor, etc. The lower post cure station 24 has an opposite arrangement, with the upper chuck ring 30B being permanently fixed to the frame 34, and the lower chuck ring 32B being supported on a movable beam 42 that is also supported by linear bearings or bushings 43 (see FIG. 6) upon the outer support columns 36. Thus, the upper and lower chuck rings 30A/B, 32A/B can be vertically separable from each other, respectively, without rotating the vulcanized tires in a turnover operation as is conventional. It is also contemplated that the arrangement of upper and lower chuck rings 30A/B, 32A/B can be modified as being either fixed or movable, or even all of the upper and lower chuck rings 30A/B, 32A/B can be movable. Stops are provided to limit movement of the movable beams 40, 42 on the outer support columns 36, including upper stop 37A and lower stop 37B.

Figure 2:
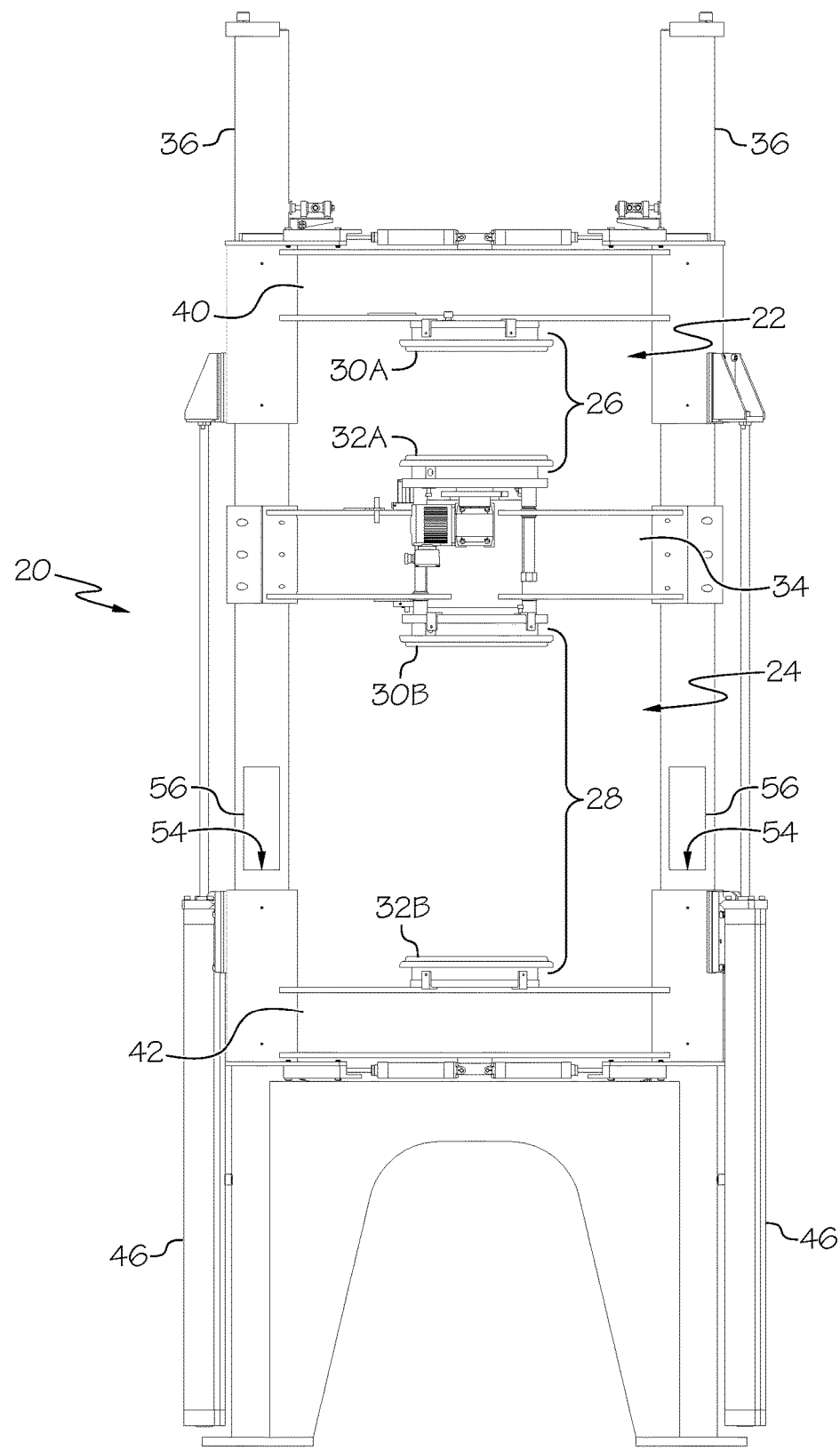
Figure 3:
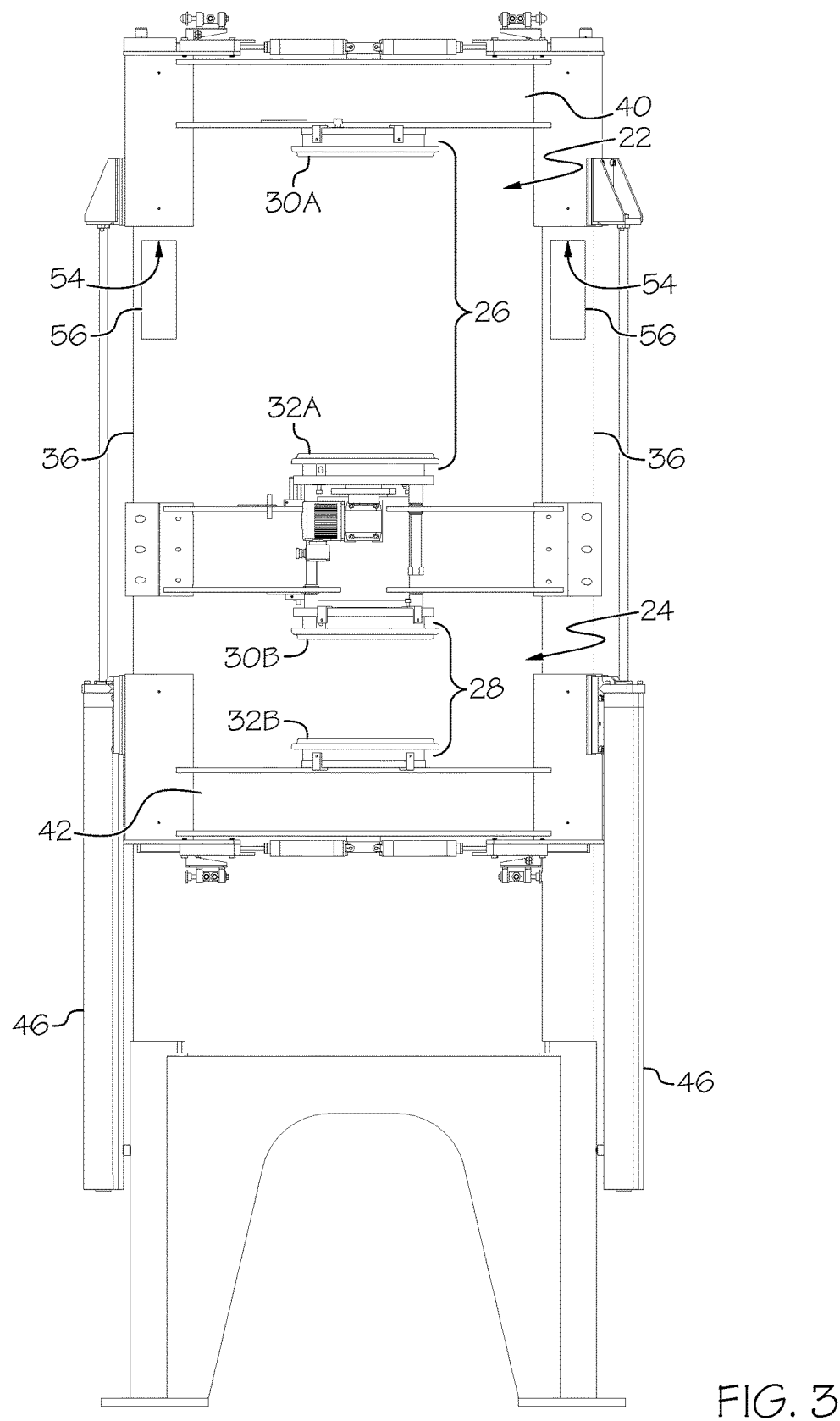

Various types of powered mechanisms can be used to move the upper and lower movable beams 40, 42. In one example, the movable beams 40, 42 can be operated together by one or more pneumatic cylinders 46. Such an arrangement can be beneficial in providing a simplified control system with a single pneumatic circuit. As shown in FIGS. 1-3, the pair of pneumatic cylinders 46 are arranged in a floating configuration, in which one end 47A of each cylinder is connected to the upper movable beam 40, and the other end 47B of each cylinder is connected to the lower movable beam 42. Thus, extension of the piston rods 49 of the cylinders 46 will act against the main body of the cylinders in an opposite manner. This arrangement provides three position conditions: both post cure stations closed (FIG. 1); only the lower post cure station 24 opened (FIG. 2); and only the upper post cure station 22 opened (FIG. 3). As a result, when it is desired to move one of the movable beams 40, 42, the other movable beam 40, 42 is secured in place to the outer support columns 36 against movement. It is preferred that, during operation of the P.C.I., only one of the upper or lower post cure stations 22, 24 is open at one time, with the other being closed. However, depending upon the construction and/or operation of the P.C.I., both post cure stations 22, 24 could be open or closed. Additionally, although two pneumatic cylinders 46 shown with one on each side, it is contemplated that only a single pneumatic cylinder could be used.

Figure 4:
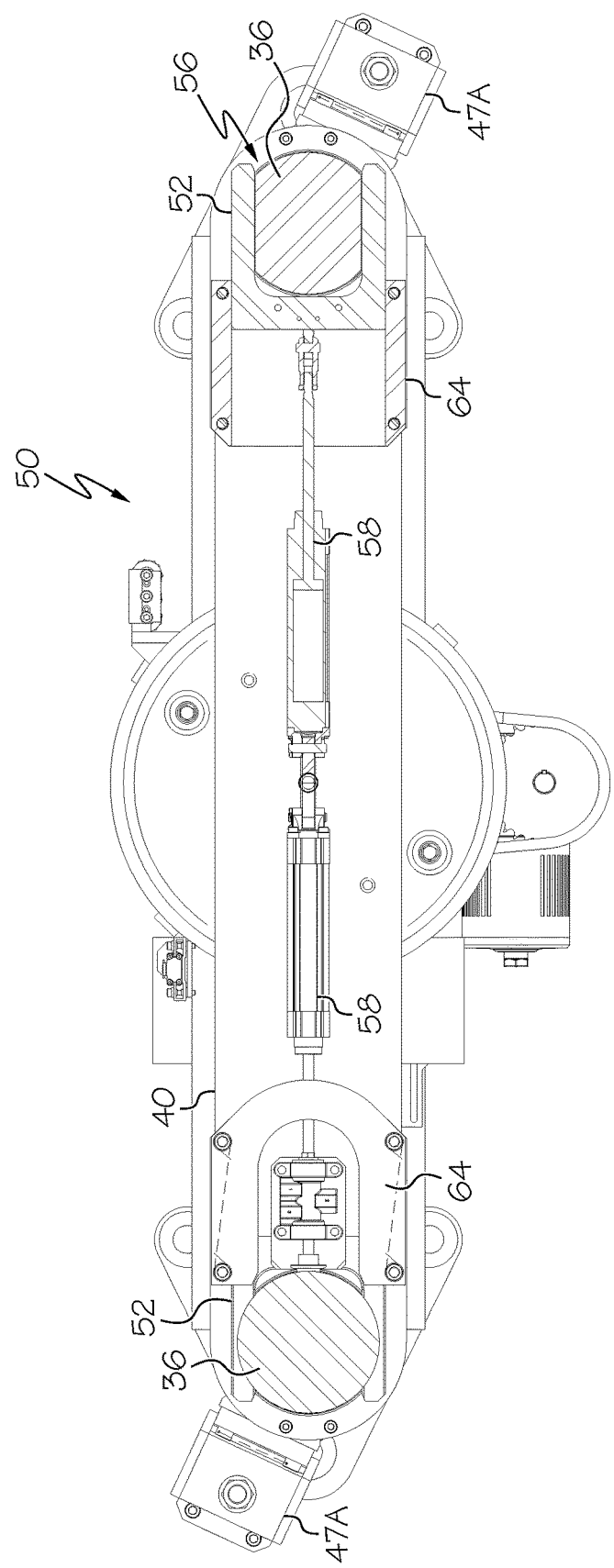
FIG. 4 illustrates a partial sectional view taken through line 4-4 of FIG. 1 that illustrates one example locking system.

Turning now to FIG. 4, one example locking system 50 is illustrated on the upper movable beam 40. It is understood that each of the movable beams 40, 42 can include a similar locking system 50, and preferably each movable beam includes a pair of locking systems for interaction with both outer support columns 36. As shown in FIG. 4, each locking system 50 includes a lock plate 52 that is configured for locking engagement with an abutment surface 54 on an adjacent outer support columns 36. The lock plate 52 comprises a generally "U"-shaped, "C"-shaped, "V"-shaped or even "L"-shaped geometry that is selectively extended around a recessed portion 56 of the outer support column 36. Where the outer support column 36 is cylindrical with a substantially circular cross-sectional geometry, the recessed portion 56 comprises a pair of flattened sections on the outside periphery of the cylinder, which terminate at the abutment surface 54. The abutment surface 54 can comprise a shoulder at an end of the recessed portion 56, such as shown in FIGS. 2-3. In the shown example, the "U"-shaped geometry of the lock plate 52 designed to be easily extended around the recessed portion 56 using a linear extension mechanism, such as a pneumatic piston 58 or the like. Both of the pistons 58 can be driven by the same pneumatic circuit to extend or retract simultaneously. Additionally, a guide plate 64 or the like can be provided upon the movable beam 40 to guide movement of the lock plate 52 and/or provide protection.

Optionally, one or more sensors 60, such as a proximity sensor, contact sensor, Hall-effect sensor, or the like, can be provided on the lock plate 52, and movable therewith, so that the control system can sense a position of the lock plate 52 relative to the outer support column 36 to determine whether the system is in a locked or unlocked condition. The guide plate 64 can have an upper cutout section to accommodate movement of the sensor 60. As shown in FIG. 4, the system is shown in a locked condition. The lock plate 52 has been extended over the recessed portion, and the movable beam 40 has been raised vertically upwards until the lock plate 52 is in contact with the abutment surface 54. As a result, the movable beam 40 is now prevented from vertically moving upwards any further. Additionally, the sensor 60, as a proximity sensor, can sense that it is located adjacent the outer support column 36 and thereby indicate that the movable beam 40 is in the locked condition. Once the movable beam 40 is locked in position, the tire inflation step for that station 22 of the post cure inflation process can begin.

Figure 5:
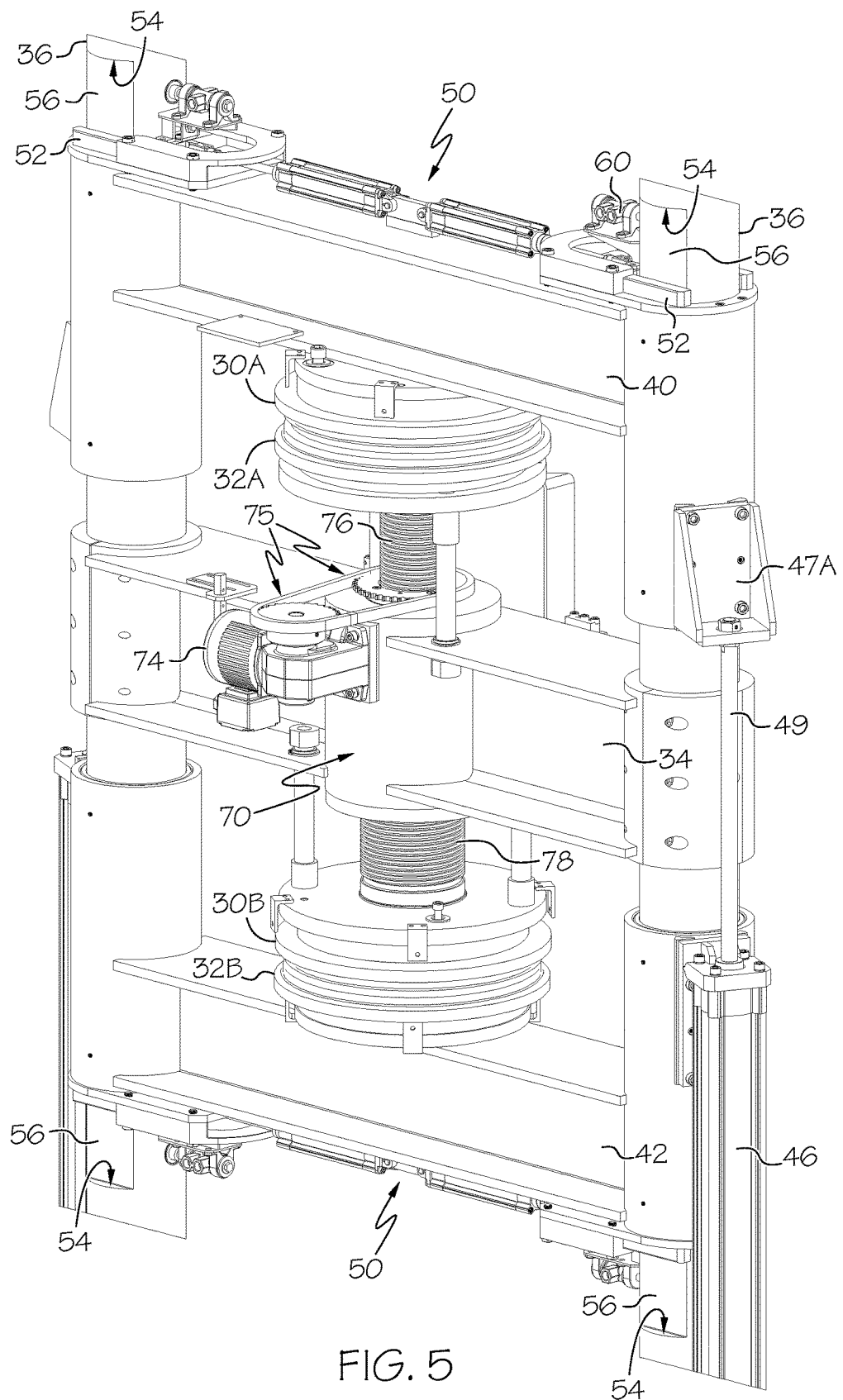
FIG. 5 illustrates a detail perspective view of one example adjustment mechanism.
Figure 6:
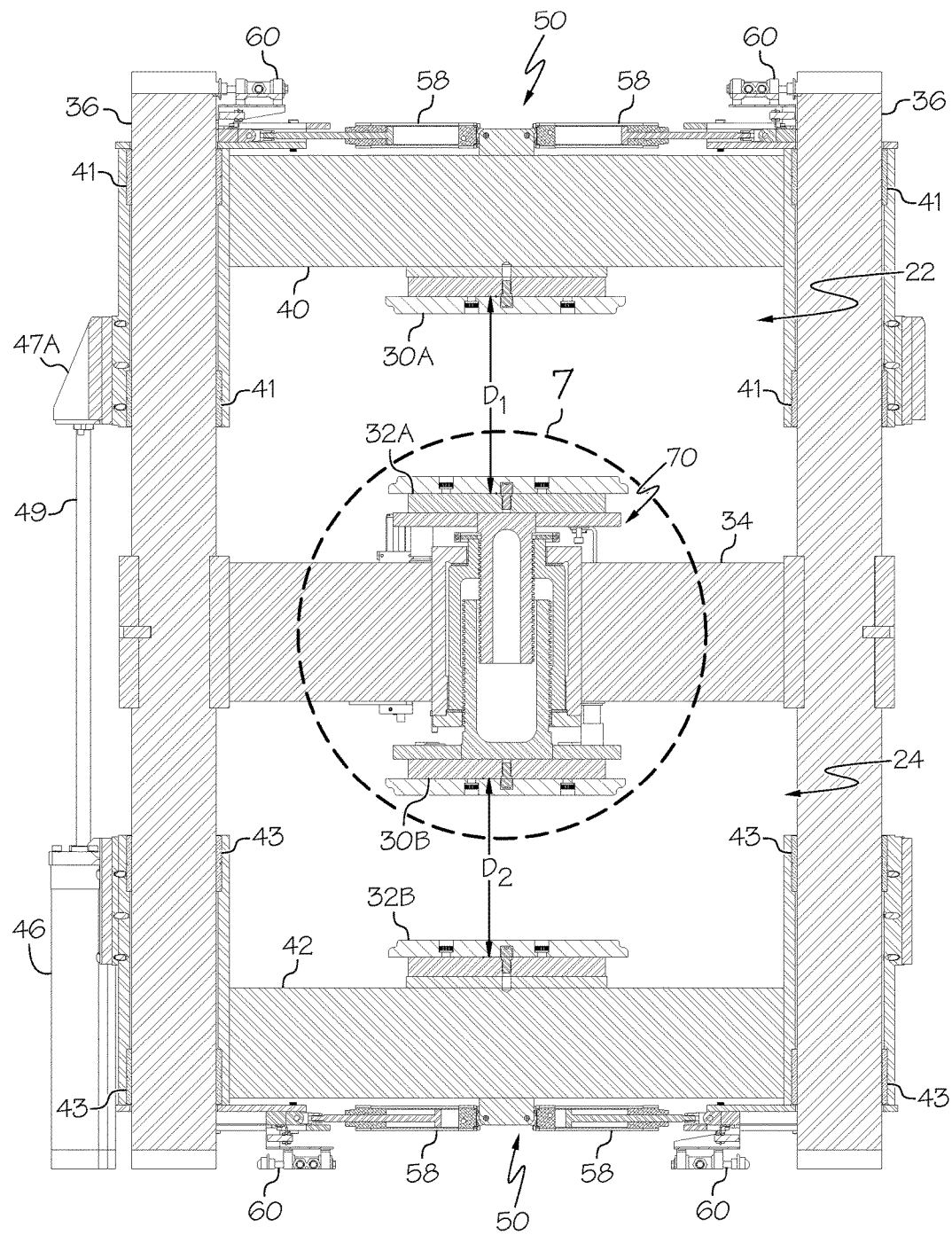
FIG. 6 illustrates a partial sectional view taken through line 6-6 of FIG. 1 that illustrates the example adjustment mechanism.
Figure 7:
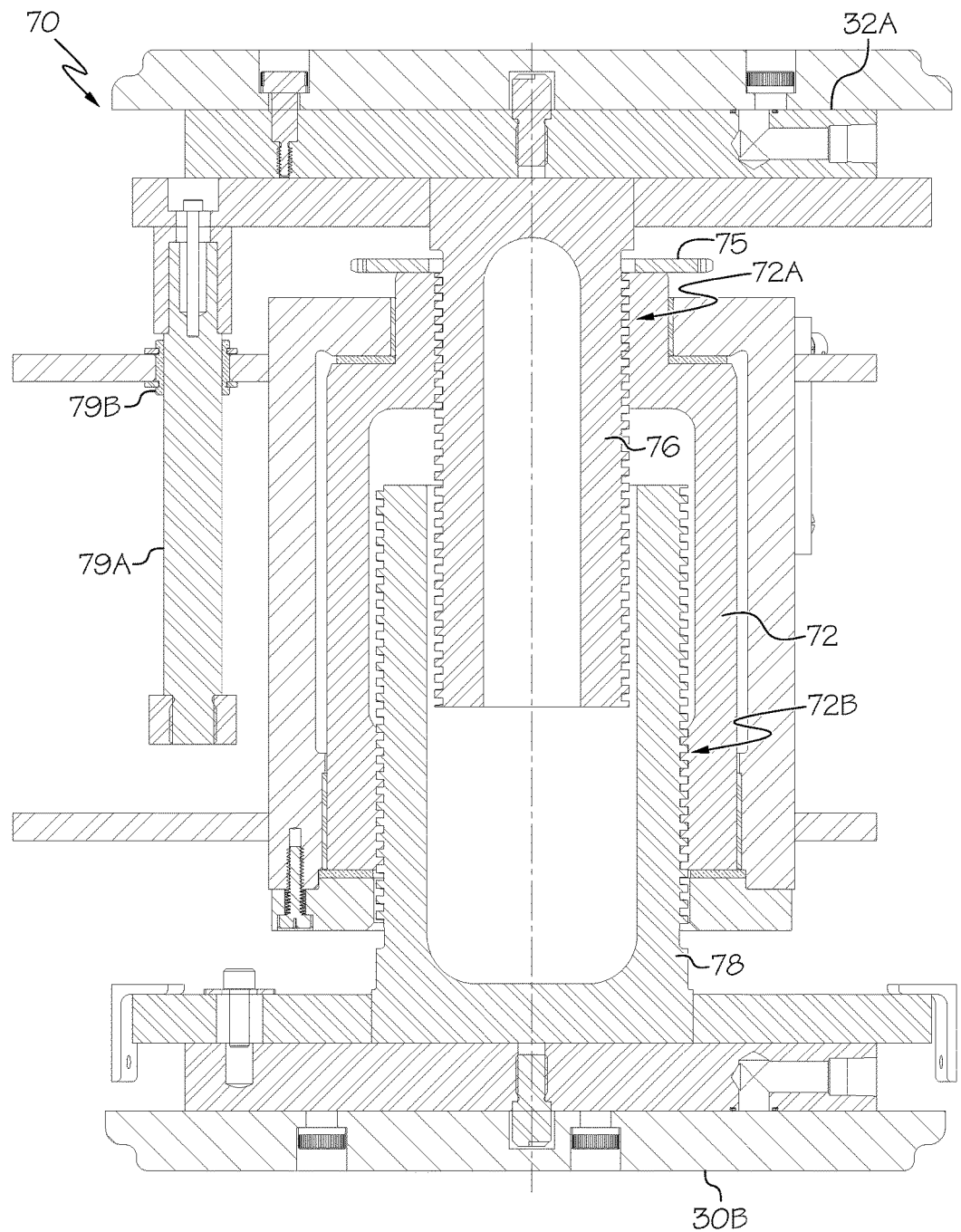
FIG. 7 is a detail view from FIG. 6.

Because the abutment surface 54 is provided at a fixed location upon the outer support columns 36, additional adjustment structure is provided so that the post cure inflator 20 can accommodate various different size tires between the upper and lower chuck rings 30A, 32A and 30B, 32B. Turning now to FIGS. 5-7, one example adjustment mechanism 70 will now be described. Preferably, the adjustment mechanism 70 is secured to the fixed frame 34 and is operable to adjust the lower chuck ring 32A of the first post cure station 22, and the upper chuck ring 30B of the second post cure station 24. The following adjustment mechanism is intended to simultaneously adjust both chuck rings 32A and 30B so that the post cure inflator 20 is set up to accommodate an identical tire size in both of the first and second cure stations 22, 24. However, it is contemplated that the adjustment mechanism could be bifurcated or otherwise modified so that each cure station can be set up for an individual tire size.

Figure 8:
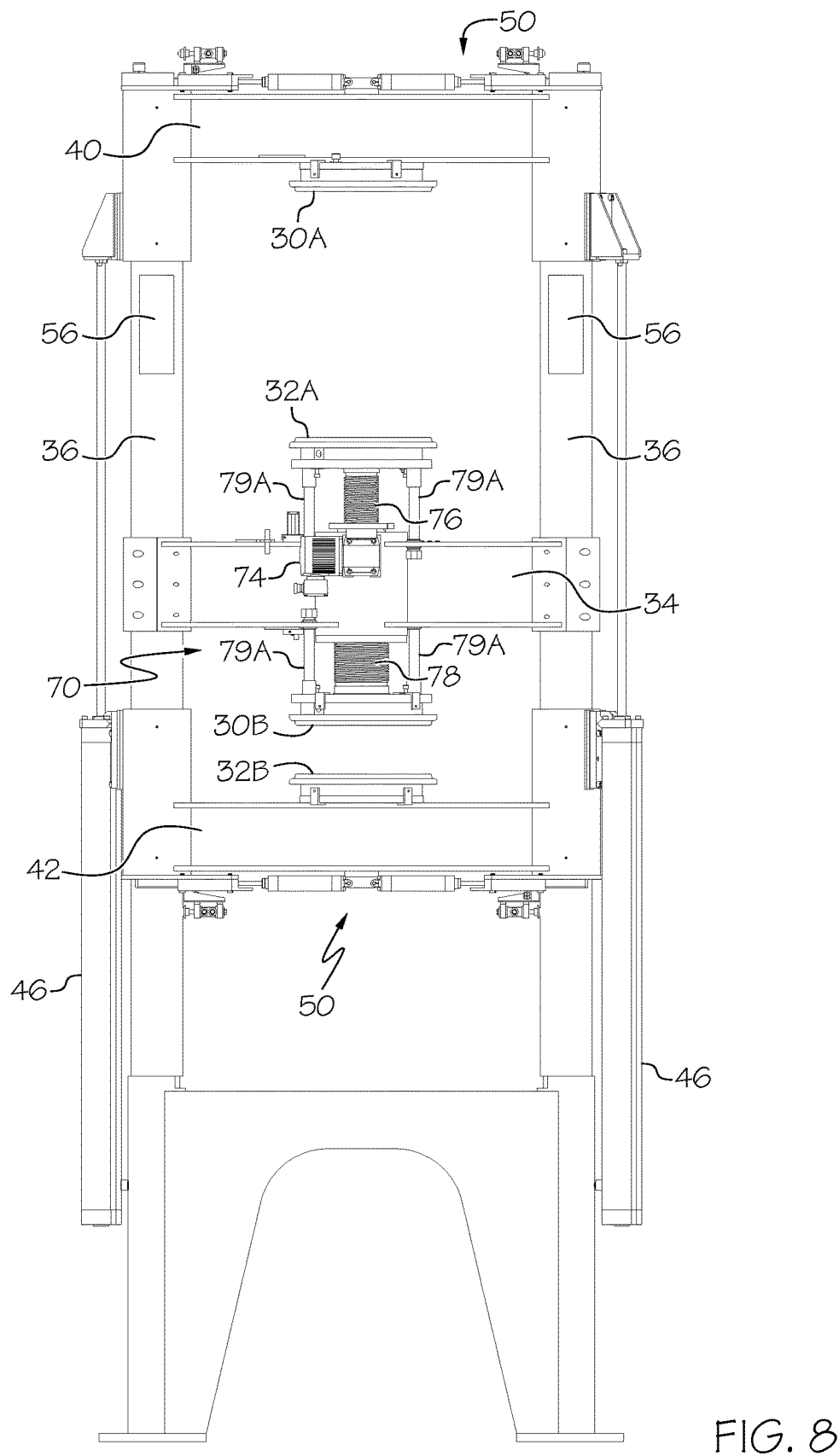
FIG. 8 is similar to FIG. 3, but shows the example adjustment mechanism in a different operative condition.

Turning to the detail view of FIG. 7, the adjustment mechanism 70 comprises a central adjusting nut 72 that is rotationally driven by an electric motor 74 (see FIG. 5), either directly or indirectly via one or more gears 75. In the example shown, one gear 75 is fixed to the central adjusting nut 72 and is driven by a second gear fixed to the motor 74, although various gearing arrangements are contemplated. Alternatively, a pneumatic motor could also be used. The electric motor 74 can be controlled by an automatic or semi-automatic control system, or even manually operated. The adjusting nut 72 comprises a first threaded section 72A intended to rotationally drive a top adjusting screw 76 fixed to lower chuck ring 32A of the upper inflator station 22, and a second threaded section 72B intended to rotationally drive a bottom adjusting screw 78 fixed to upper chuck ring 30B of the lower inflator station 24. Both threaded sections 72A, 72B can be internal to the adjusting nut 72, although the threads could also be external. FIG. 7 shows the adjustment mechanism 70 in a retracted state, while FIG. 8 shows an extended state with the upper inflator station 22 open and lower inflator station 24 closed. Preferably, one of the adjusting screws 76, 78 has a relatively larger diameter and a hollow interior that can vertically receive the other adjusting screw 76, 78 therein when in the retracted condition (i.e., see FIG. 7), to thereby reduce the operative height of the adjustment mechanism 70. As shown, the bottom adjusting screw 78 has a hollow interior to partially receive the upper adjusting screw 76.

In the shown example, both of the first and second threaded sections have an identical pitch, so that rotation of the adjusting nut 72 simultaneously drives substantially similar linear extension or retraction of the top and bottom adjusting screws 76, 78. In one example, one of the adjusting screws can have left-hand threads and the other adjusting screw can have right-hand threads of the same pitch for providing the same displacement for both top & bottom tire inflating chuck rings. Still, it is contemplated that the threaded portions of the adjusting nut 72 could have a different pitch, if it is desired to have a different linear extension of the top and bottom adjusting screws 76, 78. Thus, rotation of the adjusting nut 72 in a first direction (e.g., via motor 74 and gear 75) will cause both of the top and bottom adjusting screws 76, 78 to extend vertically outwards relative to the adjusting nut 72, which effectively brings the upper and lower chuck rings 30A, 32A and 30B, 32B, closer together, respectively. In the case of the first post cure station 22, the effective tire size is determined by the distance $D_1$ between the fixed location of the upper chuck ring 30A and the vertically adjusted lower chuck ring 32A; a similar situation occurs for the distance $D_2$ between the chuck rings 30B, 32B of the second post cure station 24. Additionally, because the movable beams 40, 42 are vertically movable when in the unlocked condition, the adjustment mechanism 70 can be moved to the desired position for a particular tire size without requiring additional changes until a new tire size will be used with the post cure inflator 20. In addition, the adjustment mechanism 70 can include one or more sensors, such as a proximity sensor, rotation sensor, distance sensor, or other position sensor, to measure the vertical extension of the top and bottom adjusting screws 76, 78. Such sensors can be used to directly or indirectly determine the distances $D_1$ and $D_2$. Finally, as shown in FIG. 7, the adjustment mechanism 70 preferably includes a vertical guide that includes one or more vertically slidable guide pins 79A or plates with a corresponding bushing 79B, bearing or the like to ensure that the top and bottom adjusting screws 76, 78 only move in a linear direction at a desired tolerance, and also do not rotate when the adjusting nut 72 is rotating. Although only one guide pin 79A is shown in FIG. 7, several are shown in FIG. 8.

Figure 9:
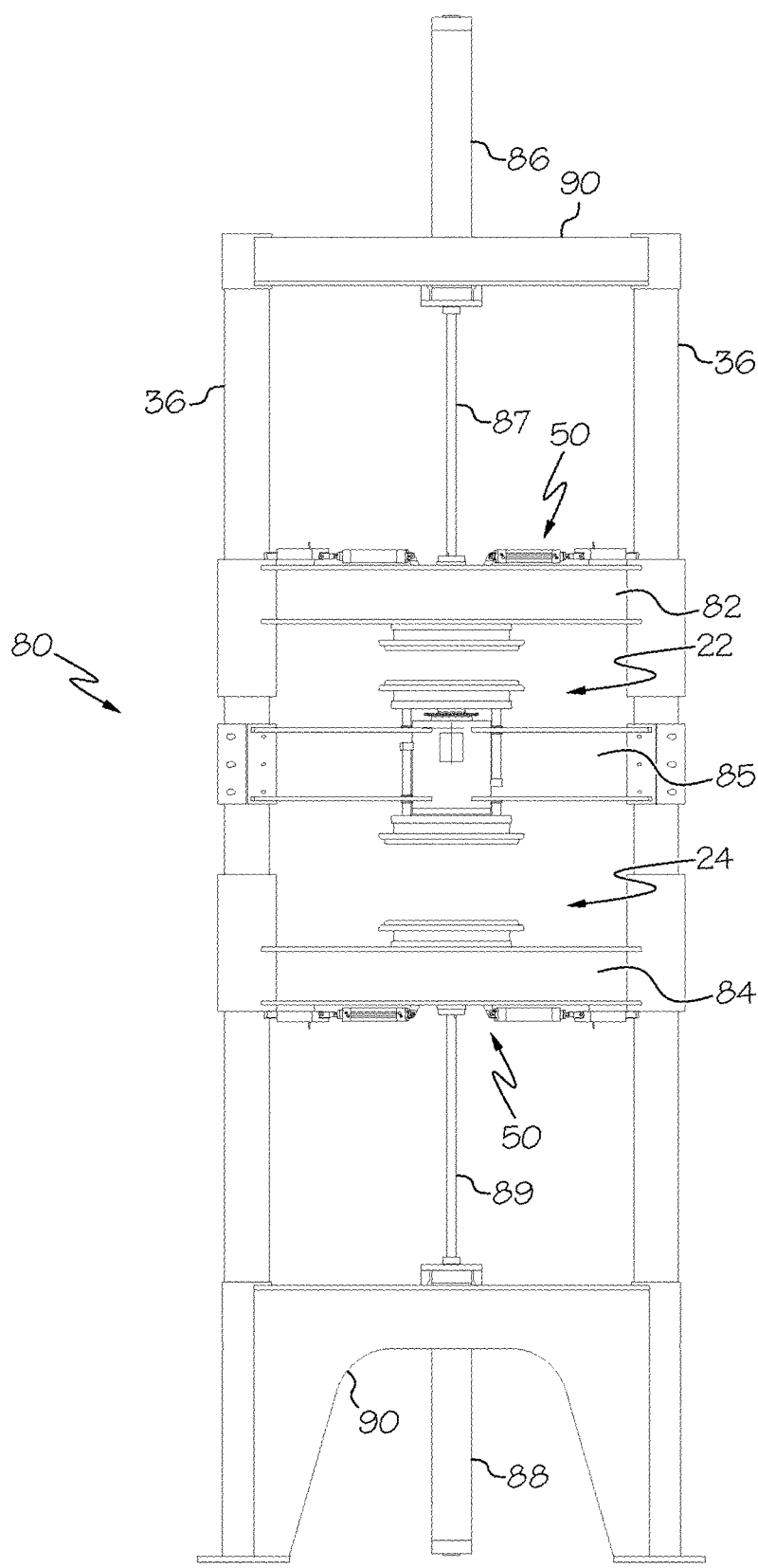
FIG. 9 illustrates a front view of another example post cure inflator.

Turning now to FIG. 9, an alternative example embodiment shown in which the post cure inflator 80 can be constructed so that each movable beam 82, 84 is independently operated for each inflator station 22, 24 (which can include upper and lower chuck rings 30A, 32A and 30B, 32B as described herein). Each of the upper and lower movable beams 82, 84 are individually movable by way of independent pneumatic cylinders 86, 88, respectively with respect to the central fixed frame 85. The upper pneumatic cylinder 86 can be secured to an upper cross frame 90 that is fixed to the outer support columns 36, with a piston rod 87 secured to the upper movable beam 82. Likewise, the lower pneumatic cylinder 88, with a piston rod 89 secured to the lower movable beam 84, can be secured to a lower support base 92, which may also be fixed to the outer support columns 36 (and/or even to the supporting surface). Although the pneumatic cylinders 86, 88 are shown to be centrally located, it is contemplated that such cylinders could be located offset from the center or even located on an exterior of the post cure inflator 20 (such as positioned outwardly like those shown in FIG. 1). By the use of independent pneumatic circuits, each pneumatic cylinder 86, 88 is individually operable for each of the upper and lower cure stations 22, 24. As a result, the upper and lower cure stations 22, 24 can be individually opened or closed depending upon the status of the post cure process for each separate tire. The post cure inflator 80 can include various features as previously described herein, such as the locking system 50 and/or the adjustment mechanism 70. Due to the independent nature of the upper and lower cure stations 22, 24 provided by the independent pneumatic cylinders, the adjustment mechanism 70 could include independently operable top and bottom adjusting screws 76, 78. For example, each adjusting screw 76, 78 could be driven by a separate motor, etc.

Figure 10:
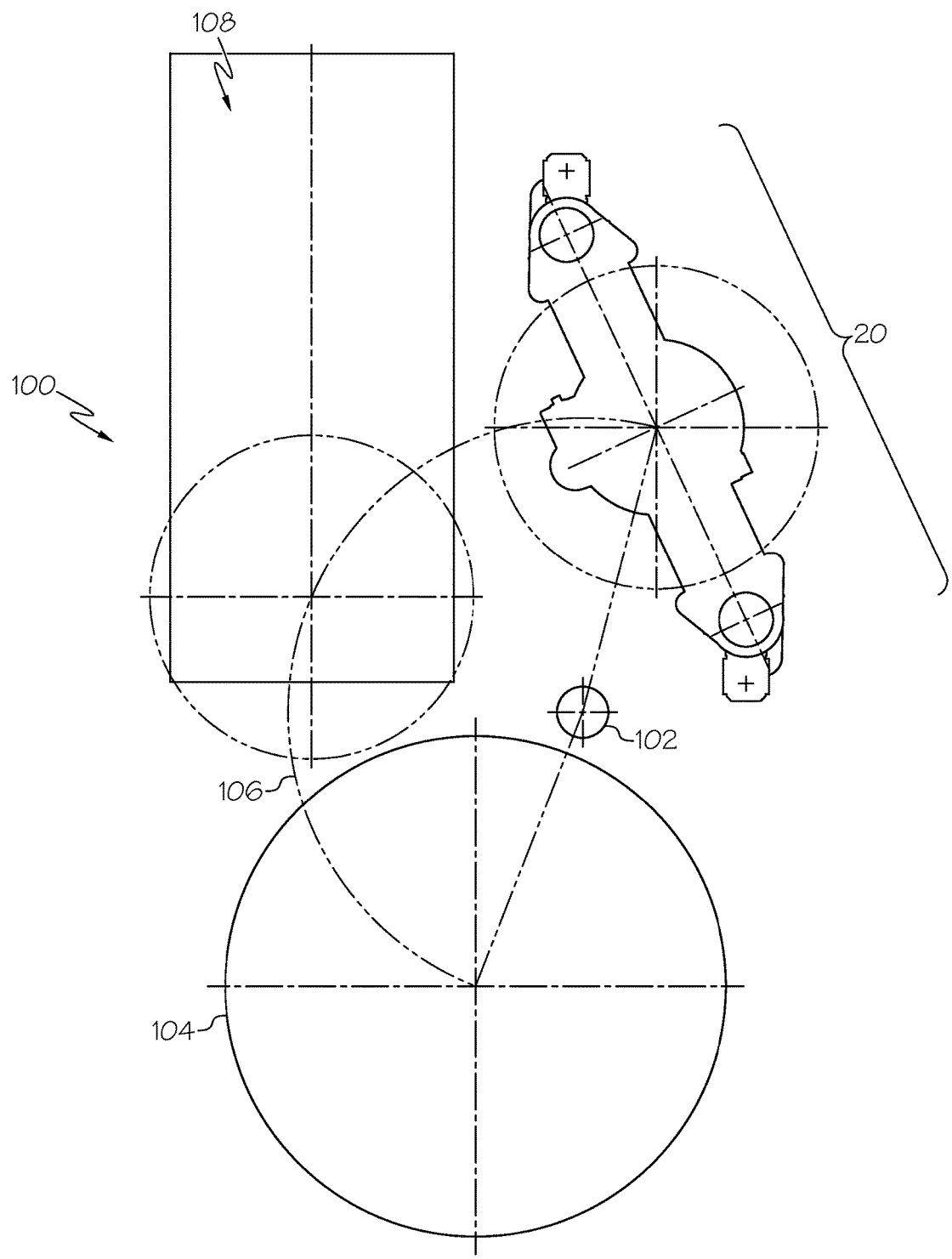
FIG. 10 is a schematic illustration of a workflow pathway that includes a post cure inflator.

Turning now to FIG. 10, which schematically illustrates an example tire manufacturing workflow 100, the post cure inflator 20 can be usable with a tire loading arm 102 of the adjacent tire curing press 104 to load and unload each vulcanized tire in a selected one of the plurality of inflator stations 22, 24 without rotating the vulcanized tires in a conventional turnover operation. A workflow pathway 106 includes the post cure inflator 20, and further includes a tire discharge station 108 located upstream or downstream. The loading arm 102 is arranged to retrieve each vulcanized tire from a tire press cavity 104 located upstream of the post cure inflator 20 and move said vulcanized tire along the workflow pathway 106 to one of the upper and lower post cure stations 22, 24. Preferably, the loading arm 102 can be vertically movable to permit individual access each of the upper and lower inflator stations 22, 24 to load and/or unload vulcanized tires, with the PCI remaining stationary. Thus, the tire loading arm 102 can include motion components along various axes, such as any or all of rotational motion, horizontal motion, and/or vertical motion. The horizontal and/or vertical motion components can be provided via extendable portions of the tire loading arm, and/or by translational movement of the entire tire loading arm. Tire loading arm can be useful where various stations are arranged horizontally and/or vertically displaced from each other, which may provide the added benefit of reducing the floor space in a factory occupied by the tire curing press and PCI. Still, it is otherwise understood that the post cure inflator 20 could include its own tire loading arm.

The loading arm 102 can further be positioned to access the tire discharge station 108 so as to be able to move a tire from the inflator stations 22, 24 and onto the tire discharge station 108. It is also contemplated that loading arm can be positioned to move a vulcanized tire directly to the tire discharge station 108 directly from the tire curing press 104 without loading said vulcanized tire in one of the plurality of inflator stations 22, 24 (e.g., a bypass operation) where no post cure inflation step is used. The tire discharge station 108 can include various powered or un-powered structure. In one example, the tire discharge station 108 can include un-powered structure, such as a table, roller track, or tire storage structure, or in another example can include a powered conveyor system, such as a powered roller track, conveyor belt, etc. In yet another example, the tire discharge station 108 can be arranged relatively flat, or can be arranged at an angle such that the tire moves away from the post cure inflator 20 under the force of gravity.

An example operation cycle will now be described. It is to be understood that any of the example steps can be done in any order, that any of the steps can be modified, and that more or less steps can be used. Starting with FIG. 1, a loading arm removes a tire from an adjacent tire curing press that has been vulcanized and is ready to be post cured. The locking system 50 attached to the lower movable beam 42 is actuated so that the lock plates 52 lockingly engage the abutment surfaces 54 of the outer support columns 36. The lower movable beam 42 is now locked in place against vertical movement. Next, the pneumatic cylinders 46 are actuated to extend the piston rods 49 to vertically lift the upper movable beam 40, thereby separating the chuck rings 30A, 32A (see FIG. 3). If desired, the adjustment mechanism 70 can be actuated (assuming there is no tire currently being cured in the lower cure station 24) for adjusting the distance $D_1$ per the appropriate tire size. In the case of the embodiment of FIG. 9, each movable beam 40, 42 can be independently operated without regard to the other.

The loading arm 102 can then rotate and move vertically upwards to take the tire from the press cavity 104 and to the upper cure station 22, ultimately seating the tire on the chuck ring 32A. The loading arm 102 then retreats and the pneumatic cylinders 46 are actuated to retract piston rod 49 again to lower the upper movable beam 40 to its predetermined tire-curing position. The locking system 50 of the upper moveable beam 40 is then actuated to lock the upper movable beam 40 against vertical movement. Finally, the vulcanized tire is inflated to the desired post-cure pressure, and left to cure for a predetermined amount of time.

As the tire curing cycle ends, the upper cure station 22 (or alternatively, the lower cure station 24 if that tire is finished curing) is opened and the loading arm removes the cured tire. The loading arm 102 then rotates back to place the cured tire upon the tire discharge station 108, where it moves onto further manufacturing operations. Optionally, the tire can remain on the loading arm 102 if the discharge conveyor is occupied with another post cured tire (not shown) that is awaiting transfer takeaway. Further, the relevant upper or lower cure station can remain in the open position to permit receipt of a future tire. The above-described cycle is performed in a repetitive manner as desired.

Various advantages of the present invention include, but are not limited to, the following aspects. In one example aspect, the post cure inflator 20 is located on a support surface, and receives operational power from at least one utilities service. Various utilities services include electric, pneumatic, gas, etc. In one example, the motive power for the post cure inflator 20 can be provided by pneumatic and electric utilities service, although a low voltage electrical system (e.g., 24 volts or the like) can also be provided for use with the control system, sensors, audio/video indicators, etc. The at least one utilities service can be provided to at least one fixed portion of the post cure inflator 20 via said support surface. It is understood that the various utilities services can be provided directly or indirectly to the post cure inflator 20. Thus, some or all of the utilities services can be conveniently located at a relatively fixed position at a lower level of the assembly with easy access and maintenance, reducing or eliminating lines/hoses to tangle or kink and no special clamping required for service lines. For example, the service lines (electric, gas, pneumatic, etc.) can extend to a fixed portion of the machine from the bottom, such as adjacent to or through the support surface, to provide for easier maintenance. Since the service lines can be attached to the fixed portion of the machine, they may be of relatively simpler construction and less prone to failure as compared to service lines that must move and flex during the operation of the machine. Moreover, the simplified utilities service can be relatively easier to maintain, especially in a tire-forming environment that utilizes numerous chemicals that can be corrosive, etc. It is understood that while various motive power options are discussed herein, it is to be appreciated that the mobile elements of the present invention can utilize any or all known motive power options, such as motors, engines, electric, pneumatic, gas, etc.

In another example aspect, electric motors, gear units or rotating mechanisms are not required as for the conventional turnover function, and the P.C.I. does not have to rotate. In yet another example aspect, P.C.I. chuck ring change is ergonomically achieved when upper and lower locking chuck rings are brought together in the down position. For example, few or zero ladders, platforms and/or lifting devices may be required by service personnel to change the upper and lower chuck rings when the device is used with different size tires.

In yet another example aspect, the multi-station layout occupies approximately the same floor space required as a traditional turnover layout. In still yet another example aspect, the innovative assembly features with very few moving parts and commonality between parts. In still yet another example aspect, commonality of parts provides simple changeover from dual cavity press to independent cavity press with little modifications.

The invention has been described with reference to the example embodiments described above. Modifications and alterations will occur to others upon a reading and understanding of this specification. Examples embodiments incorporating one or more aspects of the invention are intended to include all such modifications and alterations insofar as they come within the scope of the application.

What is claimed is:

1. A post cure tire inflator for use with a tire press to inflate and cure vulcanized tires, comprising:
    a frame fixed between a pair of outer support columns;
    a first movable beam that is linearly movable relative to the frame;
    a second movable beam that is linearly movable relative to both of the frame and the first movable beam; and
    a pair of inflator stations arranged in a vertically separated formation with each inflator station comprising a pair of axially aligned, vertically separable tire inflating chuck rings,
    wherein one of the tire inflating chuck rings from each pair of inflator stations is secured to the frame, and the other tire inflating chuck ring from each pair of inflator stations is secured to one of the first and second movable beams,
    further comprising an adjustment mechanism secured to the frame and operable to adjust a vertical position of said tire inflating chuck ring that is secured to the frame,
    wherein the adjustment mechanism comprises a central adjusting nut that rotationally drives a first adjusting screw to move said tire inflating chuck ring between an extended condition and a retracted condition, and
    wherein the adjustment mechanism is operable to adjust a vertical position of one tire inflating chuck ring from each pair of inflator stations, and the central adjusting nut rotational drives both the first adjusting screw and a second adjusting screw.

2. The post cure tire inflator of claim 1, wherein the first and second movable beams are linearly movable upon the outer support columns.

3. The post cure tire inflator of claim 1, wherein the first and second movable beams are movable via at least one pneumatic cylinder.

4. The post cure tire inflator of claim 3, wherein a pair of pneumatic cylinders are arranged in a floating configuration such that each cylinder is coupled to both of the first and second movable beams.

5. The post cure tire inflator of claim 3, wherein a pair of pneumatic cylinders are arranged in an independent configuration, such that one cylinder is coupled to only the first movable beam, and the other cylinder is coupled to only the second movable beam.

6. The post cure tire inflator of claim 1, further comprising a locking system coupled to at least one of the first and second movable beams and configured to selectively prevent movement of said at least one movable beam relative to an adjacent outer support column.

7. A post cure tire inflator for use with a tire press to inflate and cure vulcanized tires, comprising:
    a pair of inflator stations arranged in a vertically separated formation with each inflator station comprising a pair of axially aligned, vertically separable tire inflating chuck rings;
    a frame fixed between a pair of outer support columns; and
    an adjustment mechanism secured to the frame and coupled to one of the tire inflating chuck rings from each pair of inflator stations to adjust a vertical position of said one of the tire inflating chuck rings from each pair of inflator stations relative to the frame,
    wherein the adjustment mechanism comprises a central adjusting nut that rotationally drives a first adjusting screw to move one tire inflating chuck ring from the pair of inflator stations between an extended and a retracted condition, and
    wherein the central adjusting nut rotationally drives a second adjusting screw to move another tire inflating chuck ring from the pair of inflator stations between an extended and a retracted condition.

8. The post cure tire inflator of claim 7, wherein the central adjusting nut simultaneously drives both the first adjusting screw and the second adjusting screw.

9. The post cure tire inflator of claim 7, further comprising:
    a first movable beam that is linearly movable relative to the frame; and a second movable beam that is linearly movable relative to both of the frame and the first movable beam, wherein the other tire inflating chuck ring from each pair of inflator stations is secured to one of the first and second movable beams.

10. The post cure tire inflator of claim 9, wherein the first and second movable beams are linearly movable upon the outer support columns.

11. The post cure tire inflator of claim 9, wherein the first and second movable beams are movable via at least one pneumatic cylinder.

12. The post cure tire inflator of claim 11, wherein a pair of pneumatic cylinders are arranged in a floating configuration such that each cylinder is coupled to both of the first and second movable beams.

13. The post cure tire inflator of claim 11, wherein a pair of pneumatic cylinders are arranged in an independent configuration, such that one cylinder is coupled to only the first movable beam, and the other cylinder is coupled to only the second movable beam.

14. The post cure tire inflator of claim 9, further comprising a locking system coupled to at least one of the first and second movable beams and configured to selectively prevent movement of said at least one movable beam relative to an adjacent outer support column.

15. A post cure tire inflator for use with a tire press to inflate and cure vulcanized tires, comprising:
   a pair of inflator stations arranged in a vertically separated formation with each inflator station comprising a pair of axially aligned, vertically separable tire inflating chuck rings;
   a frame fixed between a pair of outer support columns;
   a first movable beam that is linearly movable relative to the frame;
   a second movable beam that is linearly movable relative to both of the frame and the first movable beam;
   an adjustment mechanism secured to the frame and coupled to one of the tire inflating chuck rings from each pair of inflator stations,
   wherein one tire inflating chuck ring from each pair of inflator stations is secured to and movable with one of the first and second movable beams, and
   wherein the other tire inflating chuck ring from each pair of inflator stations is secured to the adjustment mechanism to adjust a vertical position thereof; and
   a locking system coupled to at least one of the first and second movable beams and configured to selectively prevent movement of said at least one movable beam relative to an adjacent outer support column,
   wherein the adjustment mechanism comprises a central adjusting nut that rotationally drives a first adjusting screw to move one tire inflating chuck ring from the pair of inflator stations between an extended and a retracted condition, and also a second adjusting screw to move one tire inflating chuck ring from the other inflator station between an extended and a retracted condition.

16. The post cure tire inflator of claim 15, wherein the first and second movable beams are movable via a pair of pneumatic cylinders that are arranged in one of a floating configuration such that each cylinder is coupled to both of the first and second movable beams, or in an independent configuration, such that one cylinder is coupled to only the first movable beam, and the other cylinder is coupled to only the second movable beam.

* * * * *